UNITED STATES PATENT OFFICE.

GEORGE L. EAGAN, OF SAN FRANCISCO, CALIFORNIA.

IMPROVEMENT IN PROCESSES OF MANUFACTURING, LAYING, AND FINISHING ARTIFICIAL-STONE PAVEMENTS.

Specification forming part of Letters Patent No. 129,800, dated July 23, 1872.

*To all whom it may concern:*

Be it known that I, GEORGE L. EAGAN, of the city and county of San Francisco, in the State of California, have invented a new and useful Process of Manufacturing, Laying, and Finishing Artificial-Stone Pavement; and I do hereby declare that the following is a full, clear, and exact description of the same.

Burned earth has long been used in the manufacture of pavements, and is well known to possess, like brick, certain very important advantages for that purpose; but its porosity and consequent capacity for the absorption of water have proved so objectionable that it has never come into very extensive use except as a minor ingredient of pavement compositions. The object of my invention is to more thoroughly utilize this important material by providing for public use a means by which it can be consolidated into a hard durable artificial stone, impervious to water, and not liable to injury by frost or cold; and to this end my invention consists in the improved process for preparing, laying, and finishing artificial-stone pavements, as I will now proceed to describe.

I first prepare the earth by thoroughly calcining it by any suitable means, so as to destroy the vegetable matters contained therein and change the chemical character of the whole mass; after which I pulverize it and add a little pulverized quicklime or cement, varying the quantity according to the character of the result desired, and even dispensing with the lime and cement altogether under some circumstances. The pulverized material thus prepared is to form the pavement, only enough of other materials being used with it to cement its particles firmly together and render its mass impervious to moisture. The earth, before burning, may be mixed with a quantity of alkali in solution, for the purpose of increasing its action. The material used for moistening and cementing the burned earth when laying the pavement may be made in several different ways, among which are the following: First, pitchy, oleaginous, or bituminous matter may be combined with water by means of any of the alkalies. Secondly, the soluble silicates, either with or without the pitchy, oleaginous, or bituminous matter, may be employed. Thirdly, and better than the above, I may prepare a solution as follows, viz.: Place a quantity of water in a suitable vessel, and boil with enough alkaline matter to produce a strong lye, acidulating the water, if preferred, when quicklime is used. While the lye is still boiling add a quantity of sand previously well heated. Allow the sand to remain boiling with the solution for some time, keeping the materials well agitated; and, lastly, allow the mixture to cool and settle, after which drain off the clear liquid, and use it to moisten and cement the calcined earth when laying the pavement, as hereinafter described. Still, a fourth method of preparing the liquid for moistening and cementing the burned earth may be resorted to, viz., as follows: Slake a quantity of quicklime with an excess of water, and while slaking add the bituminous, pitchy, or oleaginous matter. The heat produced by slaking the lime, as well as the alkaline action, will cause the bitumen to be thoroughly disseminated throughout and incorporated with the whole mass. Burned earth may then be added, and the whole well beaten and mixed together. When solid bitumen is employed it may be reduced to a powder and mixed with the burned earth or other of the pulverized materials.

Having thus prepared the materials, I lay the pavement with them in the following manner: I first prepare a firm foundation, and deposit thereon my pug, consisting of the burned earth and usually a quantity of sand or fine stone, the whole slightly moistened with any of the solutions above described. I use much care that there shall be no excess of liquid, as the evaporation of the surplus water would render the work porous. One-tenth part of the mass, by measure, will usually be abundant liquid for the purpose. The pug is to be evenly spread upon the work, usually to a depth of three inches, and is then rammed with suitable tools until quite solid, after which it is to be rolled with heavy rollers until a good surface is obtained. I then apply to the surface of my work any of the solutions prepared as above described, allowing such liquid to soak well into the mass; or I may use, as an equivalent, any of the bituminous or oleaginous matters in a liquid state, preferably hot, with a quantity of spirits of turpentine or other suitable material added, that will evaporate, leaving the heavier portion in the mass. Crude petroleum heated I consider the best material for the purpose, being more penetrating and not liable to subsequent changes. After the pavement is well saturated and coated, as above described, a light dressing of sand is applied to the surface, and it is ready for use.

I do not claim the exclusive right to use any of the ingredients referred to herein, but regard the great merit of my invention as resulting from the improved process set forth, whereby burned earth can be more completely utilized than heretofore, and its disadvantages almost if not quite entirely obviated.

Having thus described my invention, what I claim is—

The process of preparing, mixing, and laying the materials to form a pavement as herein described—viz., first, preparing a quantity of pulverized calcined earth mixed with pulverized lime or cement; secondly, preparing a moistening and cementing fluid, as described; thirdly, laying the pug slightly moistened with the liquid and tamping and rolling it, as described; and, lastly, saturating the mass and coating its surface with the liquid again, all in the manner and for the purpose hereinabove set forth.

GEORGE L. EAGAN.

Witnesses:
MELVILLE CHURCH,
C. F. BROWN.